US008760666B2

(12) United States Patent
Heinisch et al.

(10) Patent No.: US 8,760,666 B2
(45) Date of Patent: Jun. 24, 2014

(54) METHOD AND APPARATUS FOR MEASURING SPACINGS BETWEEN OPTICAL SURFACES OF AN OPTICAL SYSTEM

(75) Inventors: Josef Heinisch, Wedel (DE); Stefan Krey, Pinneberg (DE); Eugen Dumitrescu, Wedel (DE); Aiko Ruprecht, Wedel (DE); Patrik Langehanenberg, Hamburg (DE)

(73) Assignee: Trioptics GmbH, Wedel (DE)

( * ) Notice: Subject to any disclaimer, the term of this patent is extended or adjusted under 35 U.S.C. 154(b) by 251 days.

(21) Appl. No.: 13/302,675

(22) Filed: Nov. 22, 2011

(65) Prior Publication Data

US 2012/0133951 A1 May 31, 2012

(30) Foreign Application Priority Data

Nov. 29, 2010 (DE) .......................... 10 2010 053 423

(51) Int. Cl.
*G01B 11/02* (2006.01)
(52) U.S. Cl.
USPC ........................................... 356/505; 356/515
(58) Field of Classification Search
USPC ............................ 356/127, 505, 508, 510, 515
See application file for complete search history.

(56) References Cited

U.S. PATENT DOCUMENTS

| 7,046,351 | B2 * | 5/2006 | Ito ................................... 356/127 |
| 7,133,225 | B1 | 11/2006 | Freimann et al. |
| 7,643,149 | B2 | 1/2010 | Freimann et al. |
| 7,656,513 | B2 * | 2/2010 | Lei ................................. 356/127 |
| 7,701,563 | B2 * | 4/2010 | Wang et al. .................... 356/127 |
| 7,760,365 | B2 * | 7/2010 | Ueki .............................. 356/515 |

FOREIGN PATENT DOCUMENTS

| DE | 10 2004 029 735 | 1/2006 |
| DE | 10 2005 013 571 | 6/2006 |
| FR | 280 302 7 | 6/2001 |

OTHER PUBLICATIONS

Wilhelm et al., "On-Axis Non-Contact Measurement of Glass Thicknesses and Airgaps in Optical Systems with Submicron Accuracy," Proc. of SPIE, vol. 6616, pp. 66163P-1 to 66163P-12 (2007).
Heinisch et al., "Novel Technique for Measurement of Centration Errors of Complex, Completely Mounted Multi-Element Objective Lenses," Proc. of SPIE, vol. 6288, pp. 628810-1 to 628810-7 (2006).

* cited by examiner

*Primary Examiner* — Michael A Lyons
(74) *Attorney, Agent, or Firm* — Lempia Summerfield Katz LLC

(57) ABSTRACT

A method for measuring spacings between optical surfaces of a multi-lens optical system includes detecting the centring state of the optical system by taking into consideration all optical surfaces of the optical system. Then the optical system is adjusted in such a way, taking the centring state into consideration, that the optical axis of the optical system is aligned as far as possible with a reference axis. In a next step the spacings between the optical surfaces are determined with the aid of a short-coherence interferometer. The measuring-light ray directed onto the optical system for this purpose runs likewise along the reference axis.

8 Claims, 4 Drawing Sheets

METHOD AND APPARATUS FOR MEASURING SPACINGS BETWEEN OPTICAL SURFACES OF AN OPTICAL SYSTEM

CROSS-REFERENCE TO RELATED APPLICATION

This application claims priority of German patent application DE 10 2010 053 423.4 filed Nov. 29, 2010, the entire disclosure of which is incorporated herein by reference.

BACKGROUND OF THE INVENTION

1. Field of the Invention

The invention relates to a method and to an apparatus for measuring spacings between optical surfaces of single-lens or multi-lens optical systems. Spacings of such a type are generally specified with reference to the optical axis of the optical system.

2. Description of the Prior Art

For the purpose of measuring spacings between optical surfaces of a single-lens or multi-lens optical system it is known to use short-coherence interferometers such as are described, for instance, in FR 2 803 027 A1 and in a paper from R. Wilhelm et al. entitled "*On-axis, non-contact measurement of glass thicknesses and airgaps in optical systems with submicron accuracy*", Proc. of SPIE, Vol. 6616 (2007), 66163P-1 to 66163P-12. Interferometers of such a type contain a light-source that generates measuring light with a very short coherence length. The beam path of the measuring light is split up with the aid of a beam-splitter into a reference arm and a measuring arm. The measuring light conducted in the measuring arm is directed onto the optical system while the optical path length of the measuring light conducted in the reference arm is varied with the aid of a mobile mirror array or similar. Measuring light reflected on the optical surfaces of the optical system is superimposed on a photodetector with the measuring light conducted in the reference arm. From interference phenomena detected by the photodetector, differences in the optical path length can be inferred that the measuring light travels on its path between the optical surfaces. For in consequence of the short coherence length of the measuring light that is used, interference phenomena arise at the photodetector only when the optical path lengths in the reference arm and in the measuring arm correspond.

Measuring apparatuses that make use of this measuring principle are offered for sale by, for example, FOGALE nanotech, Nîmes, France.

In connection with the use of short-coherence interferometers for measuring spacings between optical surfaces of optical systems it is, however, necessary that the measuring light impinges onto the optical surfaces as perpendicularly as possible. Even in the case of slightly tilted surfaces, so little light is reflected back into the interferometer that no interference signals or at best—on account of the then very low signal-to-noise ratio—barely detectable interference signals arise at the detector. Even when in the case of tilted optical surfaces the interference signals can be detected well, ultimately it is not, as desired, the spacings between the optical surfaces along the optical axis of the optical system that are measured but rather merely the spacings along the measuring direction defined by the measuring-light ray. Since this direction may deviate considerably from the optical axis of the optical system, the measured values acquired in this way are not very meaningful.

For adjusting the optical system the above mentioned paper from R. Wilhelm et al. proposes to first adjust a tip-tilt mount for the optical system using a light ray produced by a laser pointer. To this end a planar mirror is laid on the mount and the light ray is directed on the mirror. The mount is then adjusted until the light ray is reflected back onto itself. In a second step the optical system is laid on the mount and tilted until the light ray impinges perpendicularly on the optical surface pointing towards the interferometer so that it is reflected back onto itself.

SUMMARY OF THE DISCLOSURE

An apparatus and a method can measure the spacings between the optical surfaces of a single-lens or multi-lens optical system reliably and with high accuracy.

In accordance with one aspect of the disclosure, a method includes the following steps:
 a) detecting the centring state of the optical system, by
    directing a test-light ray, which propagates along a reference axis, onto the optical system, and
    detecting the location, at which the test-light ray impinges onto a location-resolving optical sensor, after it has passed completely through the optical system,
    so that all optical surfaces inside the optical system are taken into consideration;
 b) manual or extraneous-force-assisted adjusting of the optical system, taking into consideration the centring state detected in step a);
 c) transilluminating the optical system with a measuring-light ray which propagates along a reference axis;
 d) superimposing portions of the measuring-light ray that were reflected from the optical surfaces with a reference-light ray in an interferometer;
 e) determining the spacings between the optical surfaces along the reference axis by detecting and evaluating interference phenomena between the reflected portions and the reference-light ray.

By virtue of the registration of the centring state in step a), the optical system can be adjusted in step b) in such a way that the reference axis and hence also the measuring-light ray passes through the optical surfaces as perpendicularly as possible. This has the consequence, on the one hand, that considerably more measuring light is reflected back into the interferometer and can contribute to interference. On the other hand, the optical axis of the optical system is then situated closer to the reference axis, so that the interferometer actually measures, as desired, the spacings between the optical surfaces along the optical axis and not, for instance, along a reference axis that has been, where appropriate, tilted or displaced with respect thereto.

In accordance with another aspect of the disclosure, in the course of the registration of the centring state all optical surfaces of the optical system are taken into consideration. If merely a single surface of the optical system were taken into consideration in the course of the registration of the centring state, as this is the case with the method disclosed in the above mentioned paper from R. Wilhelm, then by virtue of the adjustment in step b) it could not generally be ensured that the optical system is oriented with sufficient accuracy with respect to the reference axis. In the case of a spherical optical surface, it could then at best be ensured that the centre of curvature of this surface comes to be situated on the reference axis. But the optical system might in this case still be tilted about this centre of curvature and consequently might not be centred with respect to the reference axis.

If all surfaces are taken into consideration in the registration of the centring state, the ambiguity that arises in the case of the consideration of merely one optical surfaces is nullified. The more surfaces that are taken into consideration in the registration of the centring state, the better generally will be the centring of the optical system with respect to the reference axis which is obtained in step b). For this reason, the centring state of the optical system is detected most accurately if all the optical surfaces of the optical system are taken into consideration.

By virtue of the test light ray and the optical sensor it becomes possible to detect qualitatively the centring state of the optical system relative to the reference axis predetermined by the measuring-light ray by taking into consideration all the optical surfaces with very simple means. In this connection the fact is exploited that the test-light ray is refracted on optical surfaces onto which it impinges non-perpendicularly and as a result is deflected laterally. The lateral deflection of the test-light ray is detected by the location-resolving optical sensor of the measuring apparatus. The better the optical axis of the optical system is aligned with the reference axis, the slighter is the deflection of the test-light ray on passing through the optical system.

With such a measurement in transmission the adjustment in step b) succeeds particularly simply if during detecting of the location, at which the test-light ray impinges onto the location-resolving optical sensor, the optical system is rotated about the reference axis. For during such a rotation the location detected by the optical sensor describes a circular path around the reference axis. The adjustment in step b) is continued until such time as the circular path has a minimal radius. The optical system is then oriented relative to the reference axis in such a way that its optical axis is aligned at least substantially with the reference axis. The rotation is advantageous in particular when the point of intersection of the reference axis on the optical sensor is not known, so that the spacing between the reference axis and the location at which the test-light ray impinges onto the optical sensor also cannot be ascertained.

The test-light ray and the measuring-light ray may be generated by the same light-source of the interferometer. Consequently in this case the test-light ray and the measuring-light ray are ultimately the 'same' light rays, only they are directed onto the optical system for different purposes.

In accordance with another aspect of the disclosure, an apparatus includes an interferometer that is configured to measure spacings between the surfaces along a reference axis. The apparatus includes, in addition, a centring-state-detecting device that is configured to detect the centring state of the optical system by taking into consideration at least two optical surfaces of the optical system. The centring-state-detecting device includes a test light source that is configured to direct a test-light ray propagating along the reference axis onto one side of the optical system, and a location-resolving optical sensor that is configured to detect the location at which the test-light ray impinges onto the optical sensor after it has passed completely through the optical system.

The source of test light may in this connection be a light-source arranged in the interferometer for the purpose of generating measuring light which is directed onto the optical system for the purpose of measuring the spacings.

In addition, the apparatus may exhibit a rotating mechanism that is configured to rotate the optical system about the reference axis.

BRIEF DESCRIPTION OF THE DRAWINGS

Further features and advantages of the invention will become apparent from the following description of the embodiments on the basis of the drawings.

DESCRIPTION OF PREFERRED
EMBODIMENTS

1. Introduction

Figure 1:
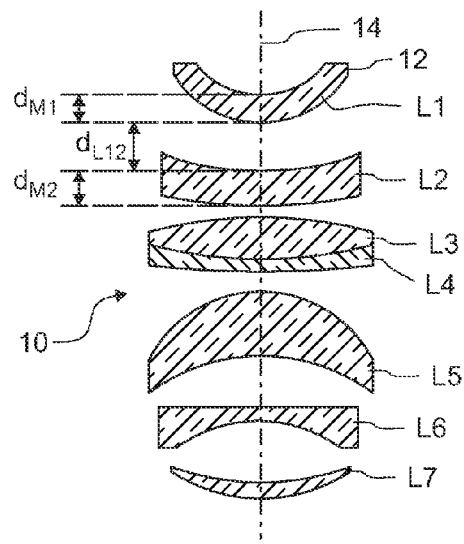
FIG. 1 is a meridional section through a multi-lens optical system, wherein all the lenses are oriented exactly along a reference axis.

FIG. 1 shows, in a meridional section, an optical system denoted overall by 10, which comprises seven lenses L1 to L7. The two lenses L3 and L4 have been joined together in gap-free manner and form a doublet which is used as an achromat. The lenses L1 to L7 have a cylindrically ground lens rim 12 which in each instance is received in a lens mount which is not represented.

In the ideal case the lenses L1 to L7 have been oriented in such a way that their optical axes all lie on a common reference axis 14 which at the same time is the axis of symmetry of the cylindrical lens rims 12. The reference axis 14 is then generally designated as the optical axis of the optical system 10. If spacings between the optical surfaces of the optical system 10 are specified or measured, these specifications or measured values relate, as a rule, to the spacings along the optical axis (here coinciding with the reference axis 14) of the optical system 10. In this connection, spacings between the optical surfaces of an individual lens are, for the most part, designated as centre thicknesses; in FIG. 1 the centre thicknesses of lenses L1 and L2 are denoted by $d_{M1}$ and $d_{M2}$, respectively. Spacings between consecutive lenses separated from one another by an air gap are, for the most part, designated as air separations; in the Figure the air separation between lenses L1 and L2 is denoted by $d_{L12}$.

Figure 2:
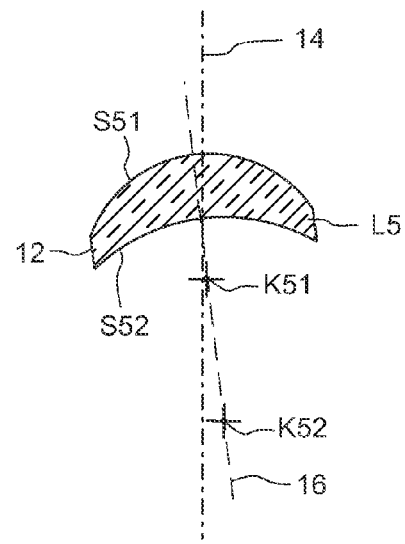
FIG. 2 is an individual lens from the optical system shown in FIG. 1, which, however, is tilted in relation to the reference axis.

In real optical systems, however, deviations from such an ideal orientation occur by reason of tolerances of manufacture and assembly. FIG. 2 shows in exemplary manner for lens L5 how a slight (represented in exaggerated manner in FIG. 2) tilting of lens L5 in the lens mount has an effect on the centring state. Let it be assumed here that the two lens surfaces S51 and S52 of lens L5 are spherical and have centres of curvature that are denoted in FIG. 2 by K51 and K52, respectively. The centres of curvature K1 and K2 define the optical axis of lens L5, which in FIG. 2 is indicated by a dashed line 16. In consequence of this definition, the optical axis 16 always runs perpendicularly with respect to the spherical optical surfaces S51, S52 of lens L5.

In the case of aspherical lenses the optical axis is defined by the centres of curvature of the spherical portion of the aspherical lens surfaces. In the case of an aspherical surface which is describable by the conventional aspheric equation $$z = \frac{ch^2}{1+\sqrt{1-(1+k)c^2h^2}} + Ah^4 + Bh^6 + Ch^8 + Dh^{10} + Eh^{12} + Fh^{14} + Gh^{16} + Hh^{18} + Jh^{20}$$

the centre of curvature is consequently given by the centre of a sphere with radius of curvature R. In the equation, z denotes the sagitta of the surface in question parallel to the optical axis, h denotes the radial spacing from the optical axis, $c=1/R$ denotes the curvature at the vertex of the surface in question, k denotes the conic constant, and A, B, C, D, E, F, G, H and J denote aspheric constants.

The tilting of lens L5 may, for example, have been caused by virtue of the fact that lens L5 was not inserted into its lens mount correctly. As a reason for this, the possibility that the lens rim 12 was not ground in such a way that its axis of symmetry is aligned with the optical axis 16 of lens L5 enters into consideration, for instance.

In the case of a multi-lens optical system, such as is shown in FIG. 1, the optical axes of the individual lenses generally lie, depending on the quality of the centring state, more or less irregularly distributed with respect to the reference axis 14. This is indicated in exemplary manner in FIG. 3 for an optical system with four lenses with centres of curvature K11, K12, K21, K22, K31, K32 and K41, K42; the optical axes of the four lenses are denoted by 161, 162, 163, 164.

Figure 3:
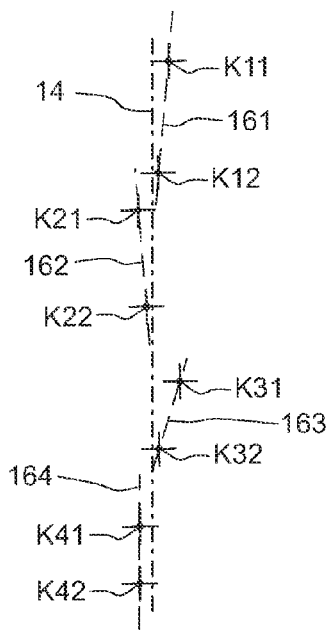
FIG. 3 is a schematic representation of the centres of curvature of a multi-lens optical system.
Figure 4:
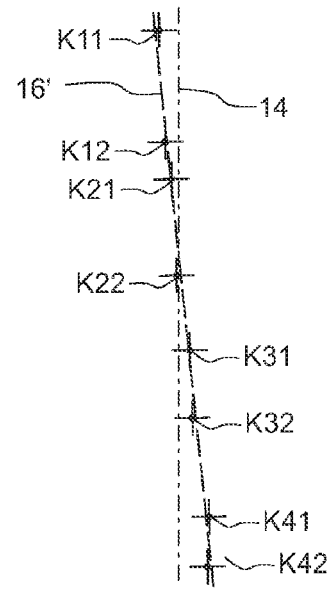
FIG. 4 is a schematic representation as in FIG. 3, wherein, however, the centres of curvature lie approximately on a straight line that is different from the reference axis.

Occasionally it may also happen that although the optical axes of the lenses are arranged (at least approximately) on a common optical axis 16', the latter is not aligned with the reference axis 14. Such a constellation is shown in FIG. 4. In addition, there are cases as shown in FIG. 3, in which although the optical axis 164 of a lens is not aligned 14 with the reference axis it does run parallel to the latter. Such a state is frequently also designated as decentring of a lens, in contrast to the tilting shown in FIG. 2.

The optical axis of a multi-lens optical system that has not been adjusted exactly is, in itself, not unambiguously defined, since the centres of curvature, as a rule, do not lie on a straight line. For this reason, by an 'optical axis' of such a system generally an axis is understood from which the centres of curvature of the lenses have, on average, a minimal spacing. An optical axis understood in this way consequently represents a type of regression line, whereby, where appropriate, differing criteria for the minimisation of the spacing may apply (e.g. arithmetic or quadratic mean, or weighting of the spacings as a function of the radii of curvature of the optical surfaces in question).

If it is desired to measure the spacings between the surfaces of the four lenses highly accurately with the aid of a short-coherence interferometer, two problems arise:

On the one hand, a highly accurate measurement of the spacings with the aid of a short-coherence interferometer succeeds reliably when the measuring light directed from the interferometer onto the optical system impinges perpendicularly onto the optical surfaces to be surveyed. If a lens is tilted or decentred, as a rule the measuring light no longer impinges perpendicularly onto the optical surfaces in question. As a result, the intensity of the light reflected back from these optical surfaces into the interferometer is, for the most part, diminished so considerably that in consequence of the then very low signal-to-noise ratio no measurement or at best a comparatively inaccurate measurement is possible.

The second problem consists in the fact that even when, despite a tilting or decentring of lenses for the optical surfaces in question, a sufficiently strong interference signal can be detected, ultimately it is not, as actually desired, the spacing between the surfaces along the optical axis that is measured, but rather along a direction that includes a not negligible angle with said axis. The deviations, resulting from this, between the actual spacings along the optical axis and the measured spacings my be considerable, this being particularly problematic when the tilting or decentring of the lenses goes unnoticed.

With a view to solving this problem, one aspect of the disclosure detects the centring state of the optical system with means at least roughly and to orient the optical system in relation to the short-coherence interferometer in such a way that the optical axis of the optical system is aligned as well as possible with a reference axis predetermined by the measuring-light ray. After adjustment has taken place, the optical system can then, for example, be oriented with respect to the reference axis in such a way that the latter constitutes a type of regression line with respect to the optical axes of the individual lenses. In the case of the arrangement shown in FIG. 3, the regression line 16' through the centres of curvature K11, K12, K21, K22, K31, K32, K41 and K42 then coincides with the reference axis predetermined by the measuring-light ray. If the optical axes lie on a straight line anyway which, however, is tilted with respect to the reference axis (cf. FIG. 4), then by means of the adjustment a state has to be established wherein a coaxial orientation of the optical axis 16' and of the reference axis 14 is obtained by tilting of the optical system.

As, in particular, the example shown in FIG. 3 shows, by virtue of such an adjustment prior to the spacing measurement it cannot be reliably ensured that all the optical surfaces are intersected perpendicularly by the reference axis 14. Consequently the measuring-light ray of the short-coherence interferometer will also not impinge exactly perpendicularly onto all the optical surfaces of the optical system. However, by virtue of the prior adjustment, taking into consideration all the optical surfaces, measurement errors that, in principle, are never entirely avoidable and that arise by virtue of tilted or decentred lenses can be minimised.

In the following sections 2 and 3 the structure and the mode of operation of a measuring apparatus according to an embodiment will be elucidated with reference to FIGS. 5 to 9. In this embodiment the centring state of the optical system relative to the reference axis 14 is detected qualitatively by a measurement in transmission. Such qualitative statements suffice, as a rule, in order to be able to orient the optical system with respect to the reference axis 14 prior to the start of the actual spacing measurement in an adjustment procedure.

In the last section 4 important method steps will be summarised once again.

2. Structure of the Measuring Apparatus

Figure 5:
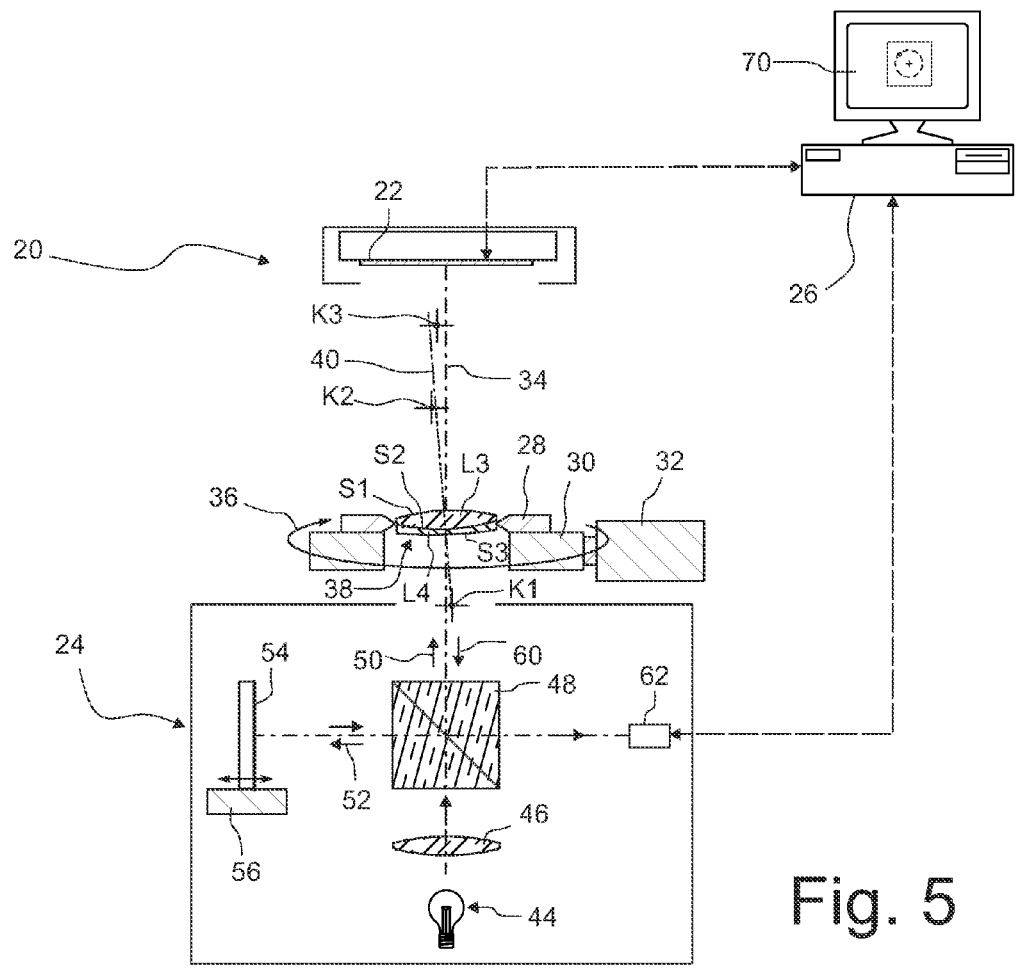
FIG. 5 is a meridional section through a measuring apparatus according to a first embodiment.

The measuring apparatus shown in FIG. 5 in a meridional section and denoted overall by 20 includes a location-resolving optical sensor 22, in the case of which it may be a question, for example, of a CCD sensor or a position-sensitive diode (PSD), and an interferometer 24. The measuring apparatus 20 further includes a computing unit in the form of a computer 26 and also a test-specimen receptacle 28 which is held by an annular rotating table 30. The rotating table 30 is, together with the test-specimen receptacle 28 arranged thereon, rotatable about a reference axis 34 with the aid of a motor 32, as indicated by an arrow 36. The rotary table 30 constitutes, together with the motor 32, a rotating mechanism of the measuring apparatus 20.

In the embodiment represented, the test-specimen receptacle 28 holds a test specimen 38, in the case of which it is a question, for the sake of simplicity, of the doublet shown in FIG. 1, which is composed of lenses L3 and L4. The three optical surfaces of this test specimen 38 are denoted by S1, S2 and S3. Of course, test specimens with substantially more lenses may also be surveyed. In the representation of FIG. 5 it is supposed that the test specimen 38 is decentred, so that the centres of curvature of the surfaces S1, S2 and S3, denoted by K1, K2 and K3, respectively, do not lie on the reference axis 34. Rather, the centres of curvature K1, K2 and K3 lie approximately on an optical axis 40 of the test specimen 38, which, however, is tilted with respect to the reference axis 34.

The interferometer 24 takes the form of a short-coherence interferometer and for this purpose includes a light-source 44 which in comparison with a source of laser light is spectrally broadband, in the case of which it may be a question, for example, of a superluminescent diode. In consequence of the comparatively large spectral bandwidth, the light generated by the light-source 44 has a substantially shorter coherence length than light that is generated by sources of laser light. Alternatively, use may also be made of a source of laser light that generates extremely short pulses of light, since such pulses of light also have a short coherence length.

Measuring light generated by the light-source 44 is concentrated by a collimator lens 46 and directed onto a beam-splitter cube 48 which splits up the measuring light into a measuring-light ray 50 directed onto the test specimen 38 and into a reference-light ray 52. The rays 50, 52 have been drawn in here, for the sake of better discernibility, offset with respect to the axes indicated by dot-dashed lines; in fact, however, they run exactly along these axes. This holds, in particular, for the measuring-light ray 50 directed onto the test specimen 38, which propagates exactly along the reference axis 34.

The reference-light ray 52 is reflected into itself by a mirror 54 which with the aid of an actuator 56 is displaceable along the beam direction. In this way it is possible for the optical path length of the reference-light ray 52 between the beam-splitter cube 48 and the mirror 54 to be changed.

The measuring-light ray 50 directed onto the test specimen 38 passes through the test specimen along the reference axis 34. The portion 60 of the measuring-light ray reflected in each instance on the optical surfaces S1, S2 and S3 gets back onto the beam-splitter cube 48 and is partly reflected from the latter in the direction of a photodetector 62. Therein the reflected portion 60 of the measuring-light ray is superimposed with the reference-light ray 52 reflected from the mirror 54.

If the difference of the optical path lengths that the reflected portion 60 of the measuring-light ray and the reference-light ray 52 have traveled as far as their path towards the photodetector 62 is of the order of magnitude of the coherence length of the measuring light generated by the light-source 44, interference phenomena occur which are detected by the photodetector 62. Since the coherence length of the measuring light generated by the light-source 64 is short, the photodetector 62 generates, as a function of the path traveled by the mirror 54, output signals that are sharply limited if the aforementioned condition is satisfied.

Figure 6:
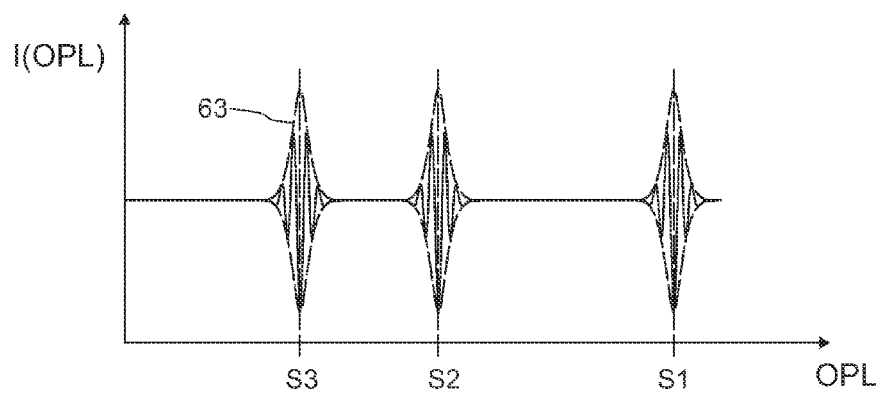
FIG. 6 is a graph in which the intensity detected during a spacing measurement by a photodetector has been plotted as a function of the optical path length that is traveled by a reference-light ray of an interferometer of the measuring apparatus.

FIG. 6 shows in exemplary manner a graph in which the intensity I detected by the photodetector 62 has been plotted over the optical path length OPL that the reference-light ray 52 travels. This optical path length is varied by displacing the mirror 54 during the measurement. Whenever the optical path lengths of the reflected portion 60 of the measuring-light ray, on the one hand, and of the reference ray 52, on the other hand, correspond, it is possible for an interference signal to be detected at the photodetector 62. On the abscissa the surfaces S3, S2 and S1 are specified that have resulted in the corresponding interference signals at the photodetector 62.

From the positions of the maxima of the envelope curves 63 of the measuring signals it is possible, taking into consideration the group refractive index of the lens materials, for the spacings between the surfaces S1, S2 and S3 to be determined with very high accuracy.

In the case of real measuring signals, further interference signals generally lie between the envelope curves 63, which, for example, have been caused by multiple reflections within the test specimen 38 and in some cases may attain relatively high levels. In order that such interfering signals do not impair the measurement, with the aid of discriminator windows which are placed around the envelope curves 63 the interfering signals can be masked out. The discriminator windows are preferentially positioned automatically where interference signals are to be expected, taking the desired spacings between the surfaces S1, S2, S3 as a basis. In order that as much measuring light as possible can be reflected from the surfaces S1, S2, S3 of the test specimen 38 and fed to the photodetector 82, the measuring-light ray 50 directed towards the test specimen can be adapted to the test specimen 38 with the aid of the collimator lens 46.

Further particulars relating to the surveying of thicknesses of transparent bodies with the aid of a short-coherence interferometer can be gathered from FR 2 803 021 A1. Short-coherence interferometers that are suitable in principle are offered for sale, inter alia, by FOGALE nanotech, Nîmes, France.

3. Sequence of the Measurement

Figure 7:
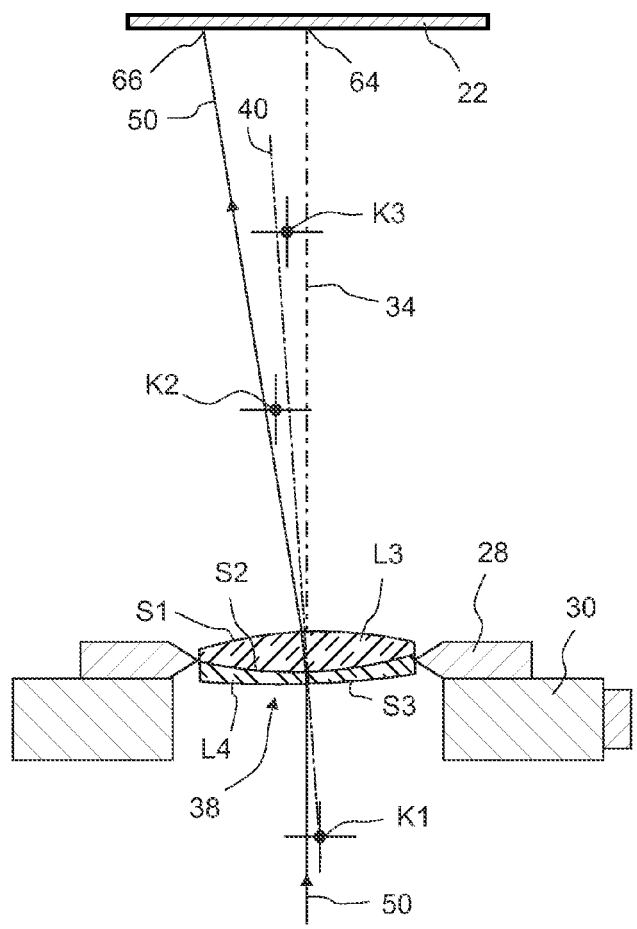
FIG. 7 is an enlarged detail from FIG. 5.
Figure 8:
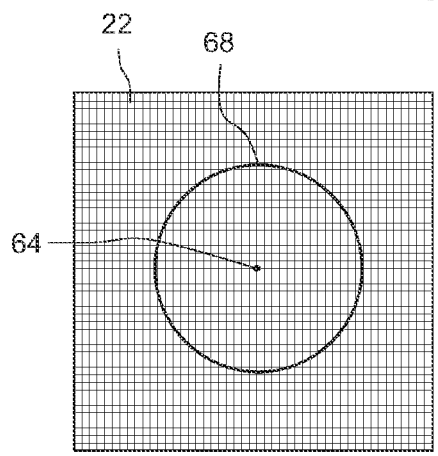
FIG. 8 is a top view of an optical sensor of the measuring apparatus, on which a circular path is represented that a test-light ray sweeps on the sensor during a rotation of the test specimen.
Figure 9:
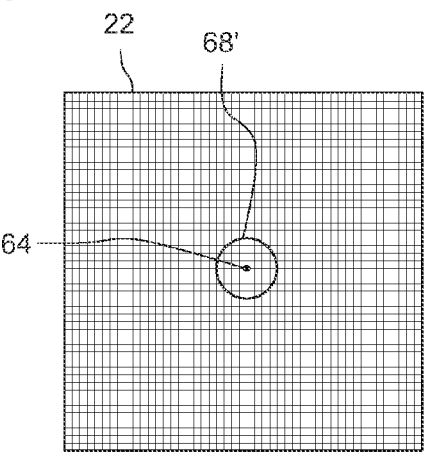
FIG. 9 is a top view like FIG. 8, but after adjustment of the test specimen.

In the following the measuring method according to one embodiment will be elucidated in more detail with reference to FIGS. 7 to 9.

a) Orientation Once Only

It will firstly be presupposed that the measuring-light ray 50 of the interferometer 24 which is directed onto the test specimen 38 propagates exactly along the reference axis 34 which is defined by the axis of rotation of the rotating table 30. Such an adjustment is undertaken once only prior to putting the measuring apparatus 20 into operation for the first time.

For the purpose of this single orientation, a plane mirror, for example, may be placed over the aperture in the rotating table 30. The reference arm is put out of operation by, for example, tilting the mirror 54. The interferometer 24 and the rotating table 30 are then oriented with respect to one another in terms of angular measure until such time as the signal detected at the photodetector has a maximal strength. From this it can be inferred that the measuring-light ray 50 is reflected into itself at the plane mirror and the plane mirror is consequently oriented perpendicularly with respect to the reference axis 34. The axis of rotation of the rotating table consequently runs parallel to the reference axis 34.

In a next step the plane mirror is replaced by a spherical lens. The interferometer 24 and the rotating table 30 are now reciprocally displaced perpendicularly with respect to the reference axis 34 until such time as the interference signal has a maximal strength. From this it can be inferred that the measuring-light ray 50 is reflected into itself at the spherical lens and the spherical lens is consequently centred on the reference axis 34. The axis of rotation of the rotating table then runs coaxially with respect to the reference axis 34.

The two adjustment steps elucidated above may, where appropriate, be repeated (also numerous times) until an optimal orientation has been achieved.

The optical sensor 22 is preferentially adjusted in such a way that its origin of coordinates lies on the reference axis 34. Such an adjustment may also be undertaken purely computationally by a relocation of the coordinate system assigned to the sensor surface.

b) Adjustment of the Test Specimen

For the purpose of elucidating the adjustment of the test specimen 38, which has to be carried out prior to the start of the actual spacing measurement, reference will be made to FIG. 7 which shows, in an enlarged representation, components of the measuring apparatus 20.

Firstly, the measuring-light ray 50 generated by the interferometer 24 is directed onto one side of the test specimen 38. In the case of the tilting of the optical axis 40 which has been assumed in FIGS. 5 and 7 the surfaces S1, S2, S3 have been relocated in such a way that the reference axis 34, and hence the measuring-light ray 50, no longer passes through the surfaces S1, S2, S3 perpendicularly. As a result, at the surfaces S1, S2, S3 a refraction of the measuring-light ray 50 occurs, with the consequence that the latter leaves the test specimen 38 at an angle with respect to the reference axis 34. Consequently the measuring-light ray 50 impinges onto the optical sensor 22 not at the point of intersection 64 of the reference axis 34 but rather at a location 66 which is spaced from the intersection point 64. This location 66 is detected by the optical sensor 22 and communicated to the computer 26 for display on a display screen 70.

In principle, qualitative statements about the centring state of the test specimen 38 can be made solely from the spacing of the location 66 from the intersection point 64. For this purpose it is merely necessary that the position of the intersection point 64 on the optical sensor 22 is determined in advance by means of a suitable procedure. If the test specimen 38 is tilted and/or relocated in the test=specimen receptacle 28 manually or with the aid of a (where appropriate, extraneous-force-assisted) manipulator and if in the method the location 66 at which the measuring-light ray 50 impinges onto the optical sensor 22 is observed, the adjustment can be continued until such time as the spacing between the location 66 and the intersection point 64 is minimal.

The adjustment (specifically, also when the position of the intersection point 64 on the optical sensor 22 is not known) succeeds better still if the test specimen 38 is rotated about the reference axis 34 with the aid of the rotating table 28. The location 66 then moves on a circular path 68 around the reference axis 34, as shown in the top view of the optical sensor 22 according to FIG. 8. An optimal orientation of the test specimen 38 with respect to the reference axis 34 is obtained when the radius of the circle 68' described on the optical sensor is minimal, as shown in FIG. 9.

It will be understood that, instead of the measuring-light ray 50, a test-light ray generated by a different light-source can also be directed through the test specimen 38 onto the optical sensor 22 in order to be able to carry out the above adjustment.

c) Spacing Measurement

After conclusion of the adjustment described above, the test specimen 38 has been oriented with respect to the reference axis 34 in such a way that its optical axis 40 is aligned with the reference axis 34. Lenses L3 and L4 are then tilted only minimally in relation to the reference axis 34. If the spacings between the surfaces S1, S2, S3 are now measured, in the manner described above with reference to FIG. 5, with the aid of the interferometer 24, the measuring-light ray 50 passes through the surfaces S1, S2, S3 approximately perpendicularly. As a result, on the one hand it is now guaranteed that the measuring-light ray reflected from the surfaces S1, S2, S3 has a maximal intensity and for this reason generates distinctly discernible interference signals at the photodetector 62 upon superposition with the reference-light ray 52. On the other hand, by virtue of the orientation of the optical axis 40 of the test specimen 38 with respect to the reference axis 34 it is guaranteed that the spacings between the optical surfaces S1, S2, S3 are actually measured along the optical axis of the test specimen 38.

5. Summary of Important Method Steps

Figure 10:
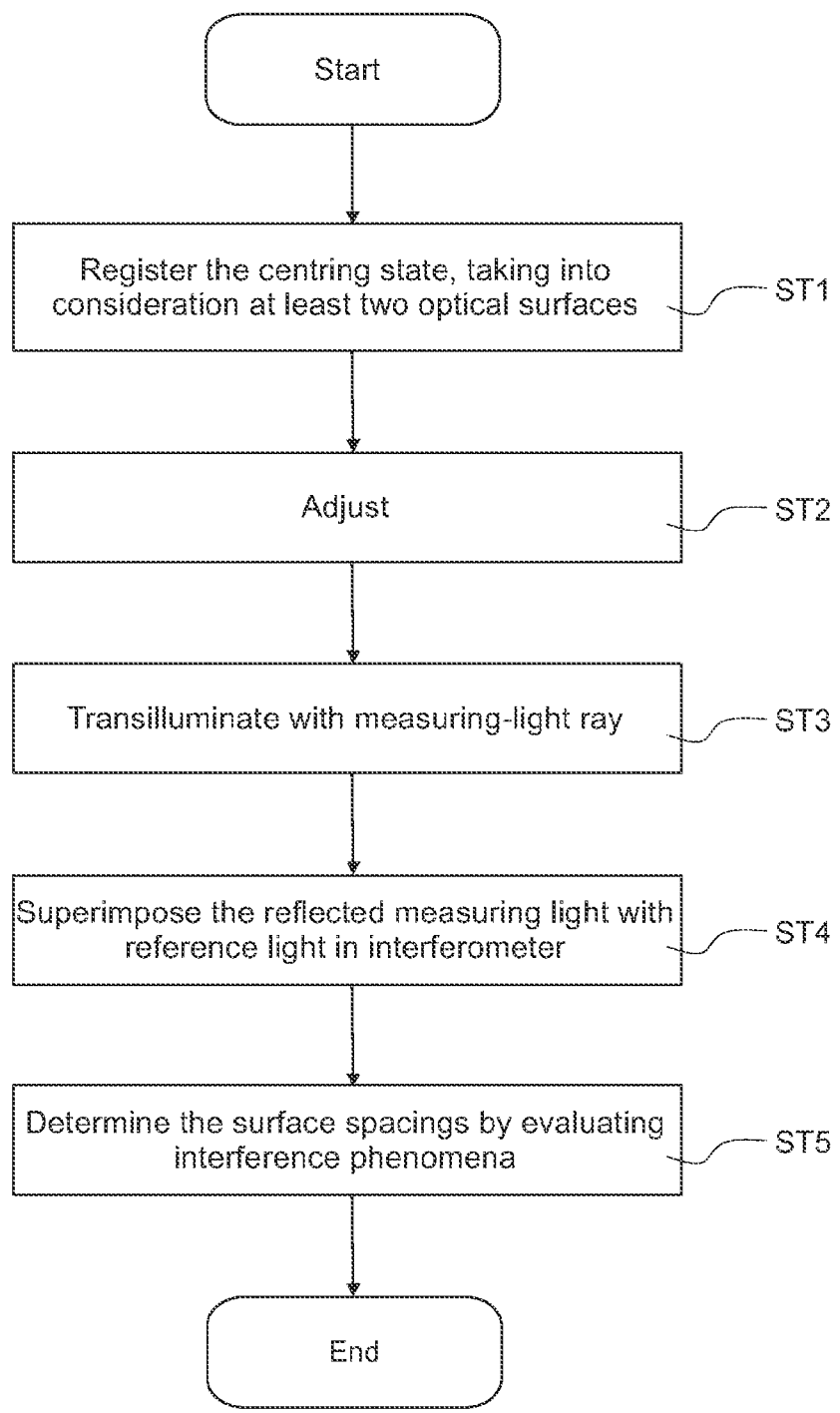
FIG. 10 is a flow chart for elucidating important steps of the method according to one embodiment.

In the following, reference will be made to FIG. 10, which shows a flow chart in which steps of the method according to one embodiment are listed.

In a first step ST1 the centring state of the test specimen 38 or, quite generally, of a single-lens or multi-lens optical system is detected, taking into consideration at least two, preferentially all, of its optical surfaces.

In a second step ST2 the test specimen 38 is adjusted, preferentially in such a way that its optical axis 40 is aligned as exactly as possible with the reference axis 38.

In a third step ST3 the test specimen 38 is transilluminated with the measuring-light ray 50.

In a fourth step ST4 the measuring light reflected from the test specimen 38 is superimposed with reference light in the interferometer 24.

In a fifth step ST5 the surface spacings are determined by evaluating interference phenomena on the photodetector 62.

The invention claimed is:

1. A method for measuring spacings between optical surfaces of an optical system, comprising the following steps:
    a) detecting a centring state of the optical system by
        directing a test-light ray, which propagates along a reference axis, onto the optical system, and
        detecting a location, at which the test-light ray impinges onto a location-resolving optical sensor, after it has passed completely through the optical system,
        so that all optical surfaces inside the optical system are taken into consideration;
    b) adjusting the optical system, taking into consideration the centring state detected in step a);
    c) transilluminating the optical system with a measuring-light ray which propagates along the reference axis;
    d) superimposing portions of the measuring-light ray that were reflected from the optical surfaces with a reference-light ray in an interferometer;
    e) determining the spacings between the optical surfaces along the reference axis by detecting and evaluating interference phenomena between the reflected portions and the reference-light ray.

2. The method of claim 1, wherein the optical system is rotated about the reference axis during step b).

3. The method of claim 2, wherein from a change in the location detected by the optical sensor during the rotation a deviation of an optical axis of the optical system from the reference axis is inferred, and wherein the adjustment in step b) is continued until such time as the optical axis of the optical system runs coaxially with respect to the reference axis.

4. The method of claim 3, wherein the location detected by the optical sensor during the rotation about the reference axis describes a circular path around the reference axis, and wherein the adjustment in step b) is continued until such time as the circular path has a minimal radius.

5. The method of claim 1, wherein the test-light ray and the measuring-light ray are generated by a common light-source.

6. An apparatus for measuring spacings between optical surfaces of a multi-lens optical system, comprising
   a) an interferometer that is configured to measure spacings between the surfaces along a reference axis, and with
   b) a centring-state-detecting device that is configured to detect the centring state of the optical system by taking into consideration all optical surfaces of the optical system, wherein the centring-state-detecting device comprises:
      a test-light source that is configured to direct a test-light ray propagating along the reference axis on one side of the optical system;
      a location-resolving optical sensor that is configured to detect the location at which the test-light ray impinges on the optical sensor after it has passed completely through the optical system.

7. The apparatus of claim 6, wherein the test-light source is a light source arranged in the interferometer for the purpose of generating measuring light, which for the purpose of measuring the spacing is directed onto the optical system.

8. The apparatus of claim 6, further comprising a rotating mechanism that is configured to rotate the optical system about the reference axis.

* * * * *